United States Patent
Frutschi et al.

(10) Patent No.: US 6,945,052 B2
(45) Date of Patent: Sep. 20, 2005

(54) METHODS AND APPARATUS FOR STARTING UP EMISSION-FREE GAS-TURBINE POWER STATIONS

(75) Inventors: Hans Ulrich Frutschi, Riniken (CH); Timothy Griffin, Ennetbaden (CH); Daniel Holmberg, Aengelholm (SE); Roland Span, Paderborn-Sande (DE)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/808,491

(22) Filed: Mar. 25, 2004

(65) Prior Publication Data

US 2004/0237536 A1 Dec. 2, 2004

Related U.S. Application Data

(63) Continuation of application No. PCT/IB02/04006, filed on Sep. 30, 2002.

(30) Foreign Application Priority Data

Oct. 1, 2001 (CH) .............................................. 1809/01

(51) Int. Cl.$^7$ ......................... F01K 23/10; F01K 21/04; F02C 3/34; F02C 6/00
(52) U.S. Cl. ...................... 60/772; 60/774; 60/39.182; 60/39.52; 60/784; 122/7 B
(58) Field of Search ........................... 60/772, 774, 778, 60/39.182, 39.5, 39.52, 784; 122/7 R, 7 B

(56) References Cited

U.S. PATENT DOCUMENTS

| | | | | |
|---|---|---|---|---|
| 3,118,429 A | * | 1/1964 | Hochmuth .................. | 122/7 R |
| 4,125,996 A | * | 11/1978 | Schmoch .................. | 60/39.182 |
| 4,437,313 A | * | 3/1984 | Taber et al. ............. | 60/39.182 |
| 4,784,069 A | * | 11/1988 | Stark .......................... | 60/39.5 |

(Continued)

FOREIGN PATENT DOCUMENTS

| | | |
|---|---|---|
| EP | 0 731 255 | 9/1996 |
| EP | 0 939 199 | 9/1999 |
| FR | 1 185 481 | 7/1959 |
| WO | WO97/07329 | 2/1997 |
| WO | WO99/25957 | 5/1999 |
| WO | WO01/90548 | 11/2001 |
| WO | WO03/029618 | 4/2003 |

OTHER PUBLICATIONS

Shao et al. "Natural Gas Fired Combined Cycle Power Plant with $CO_2$ Capture," Energy Conversion and Management, 26(12):1115–1128 (1995) Pub by Elservier Science Ltd. (Great Britain).
PCT Search Report for PCT/IB02/04006.
Search Report from Switzerland 2001 1809/01 (Oct. 1, 2001).
PCT International Preliminary Examination Report for PCT/IB02/04006.

*Primary Examiner*—Ted Kim
(74) *Attorney, Agent, or Firm*—Cermak & Kenealy, LLP; Adam J. Cermak

(57) ABSTRACT

In a power generation plant having at least one gas turbine cycle with heat-recovery boiler (4) and at least one steam turbine cycle operated via the heat-recovery boiler (4), the gas turbine cycle being designed to be semi-closed and essentially free of emissions and essentially comprising a compressor (1), a combustion chamber (2) arranged downstream of the compressor (1), a gas turbine (3) arranged downstream of the combustion chamber (2), a heat-recovery boiler (4) arranged downstream of the gas turbine (3), and at least one generator (8) coupled to the gas turbine (3), modes of operation with the gas turbine cycle stopped and start-up using fresh air are made possible by first means (12) being arranged which alternatively or additionally allow hot gas to be fed into the hot-gas path (23) between gas turbine (3) and heat-recovery boiler (4), and by second means (15) being arranged which alternatively or additionally allow exhaust gas to be expelled from the exhaust-gas path (40) downstream of the heat-recovery boiler (4).

25 Claims, 3 Drawing Sheets

U.S. PATENT DOCUMENTS

| | | | | |
|---|---|---|---|---|
| 4,919,169 A | * | 4/1990 | Bachmann et al. | 60/39.182 |
| 5,042,246 A | | 8/1991 | Moore et al. | 60/39.03 |
| 5,148,668 A | | 9/1992 | Frutschi | 60/39.05 |
| 5,175,995 A | | 1/1993 | Pak et al. | 60/39.182 |
| 5,247,907 A | * | 9/1993 | Lee et al. | 122/7 R |
| 5,697,210 A | * | 12/1997 | Kawauchi | 60/39.182 |
| 5,737,912 A | * | 4/1998 | Krakowitzer | 60/39.182 |
| 5,881,551 A | * | 3/1999 | Dang | 60/39.182 |
| 6,463,741 B1 | * | 10/2002 | Frutschi | 60/39.182 |
| 6,782,703 B2 | * | 8/2004 | Dovali-Solis | 60/39.182 |

* cited by examiner

METHODS AND APPARATUS FOR STARTING UP EMISSION-FREE GAS-TURBINE POWER STATIONS

This application is a continuation of and claims priority under 35 U.S.C. §120 to International application no. PCT/IB02/04006, filed 30 Sep. 2002, and claims priority under 35 U.S.C. §119 to Swiss application no. 2001 1809/01, filed 1 Oct. 2001, the entireties of both of which are incorporated by reference herein.

TECHNICAL FIELD

The present invention relates to a power generation plant having at least one gas turbine cycle with heat-recovery boiler and at least one steam turbine cycle operated via the heat-recovery boiler, the gas turbine cycle being designed to be semi-closed and essentially free of emissions and essentially comprising a compressor, a combustion chamber arranged downstream of the compressor, a gas turbine arranged downstream of the combustion chamber, a heat-recovery boiler arranged downstream of the gas turbine, and at least one generator coupled to the gas turbine. The invention also relates to methods of starting up and of operating such a power generation plant.

PRIOR ART

Within the limits of general attempts to develop power stations which produce as little environmental pollution as possible, there are a large number of different projects whose aim is to develop emission-free gas turbine power stations having a semi-closed $CO_2/H_2O$ cycle. In this case, the natural gas used as fuel is burned with as far as possible pure oxygen. Combustion gases which consist virtually only of carbon dioxide and water are produced under these circumstances. If water is condensed out of the working medium, largely pure carbon dioxide is obtained, which can be liquefied by compression and can be used and disposed of in different ways.

To utilize the high temperatures at the turbine outlet, a steam generator is used as a rule, the steam produced being used to drive a bottoming steam turbine. Since the turbine outlet temperature under normal pressure conditions for $CO_2/H_2O$ mixtures is higher than in conventional gas turbines, the steam cycle in such systems delivers up to about 50% of the total output.

Alternatively, the generated steam can be pre-expanded in a topping steam turbine in order to then be mixed with the working medium of the gas turbine upstream of, in or downstream of the combustion chamber. The injected steam, after flowing through the heat-recovery boiler, can then be condensed out together with the water produced by the combustion. Both concepts are described in more detail in EP 0 731 255 B1.

The use of emission-free gas-turbine power stations is nowadays considered in particular in the oil and gas industry, since the separated carbon dioxide can be used there to a considerable extent (Enhanced Oil Recovery, EOR) and, in part, already heavy taxes have to be paid for emitted carbon dioxide. In the oil and gas industry, however, power stations are often operated in an environment in which it is difficult or not possible to draw start-up power from the network (remote coastal locations, drilling platforms, etc.). This problem is made more difficult in emission-free power stations of the type described above by virtue of the fact that an air separation plant mainly of cryogenic design has to be started up before the start-up of the turbine, this air separation plant, for a period of 2 to 4 hours, requiring approximately 10% of the network output of the power station in order to achieve a stable operating point.

For an autonomous start-up operation, current which is generated by the generators of the integrated steam turbines can be used in conventional gas-turbine power stations. As an example of this, an arrangement according to U.S. Pat. No. 5,148,668 can be used, in which a hot-water reservoir charged during operation delivers the steam required for the start-up. In order to provide the requisite steam for a longer period, auxiliary firing of the hot-water reservoir is provided in this patent. Because no rapid start is possible for emission-free power stations, recourse cannot be had to the concept of the use of a hot-water reservoir.

DESCRIPTION OF THE INVENTION

One object of the invention is therefore to provide an emission-free, semi-closed power station plant of the above-mentioned type, that is to say according to the preamble of patent claim 1, which power station plant operation and start-up with minimum start-up output.

The present invention achieves this object by first means being arranged which alternatively or additionally allow hot gas to be fed into the hot-gas path between gas turbine and heat-recovery boiler, and by second means being arranged which alternatively or additionally allow exhaust gas to be expelled from the exhaust-gas path downstream of the heat-recovery boiler.

This surprisingly simple modification of the gas turbine cycle allows the heating of the heat-recovery boiler while the turboset is stopped or still does not have sufficiently high capacity (or even no longer has sufficiently high capacity), in such a way that the steam turbine cycle can be operated in an energy-generating or in particular current-generating manner. In other words, the heat-recovery boiler through which an exhaust-gas mixture of the gas turbine plant flows during normal operation is operated as an auxiliary-fired steam generator. The generators of the steam turbines to which the steam thus generated is admitted, given an appropriate design of the auxiliary firing, generate sufficient current in order to be able to start up both an air separation plant, possibly present for the supply with pure oxygen, and the gas turbine. In addition, the modification allows the steam turbine cycle to be operated in a current-generating manner on its own, and the plant can therefore also assume the function of an emergency generating unit, which may become necessary, for example, during possible outage times of air separation plant and/or gas turbine. In this case, the exhaust gas expelled from the exhaust-gas path is normally discharged via an auxiliary stack.

According to a first, especially simple and preferred embodiment of the invention, the first and second means are switch-over members which allow the feeding-in or expelling in particular by resetting air flaps.

According to a further embodiment of the invention, the additional hot gas, to be alternatively or additionally fed into the hot-gas path, is provided by one or more auxiliary burners which are preferably supplied with fresh air via a blower. In principle, however, it is also possible to provide the hot gas in another way, for example via heat exchangers, catalysts, etc.

The power generation plant according to the invention is advantageously operated as a $CO_2/H_2O$ plant, that is to say a $CO_2/H_2O$ gas turbine cycle is involved in which $CO_2$ and $H_2O$ produced, via corresponding means for compression and/or means for cooling, are removed from the gas turbine cycle, in particular preferably in such a way as to branch off directly downstream of the compressor, and in particular in a solid and/or liquid form, the gas turbine cycle being supplied with largely pure oxygen in particular via an air separation plant. In this case, the air separation plant may be of cryogenic design or may be based on a diaphragm process.

According to another preferred embodiment of the invention, the steam turbine cycle is of essentially closed design and has at least one steam turbine and at least one generator coupled thereto. In this case, the steam turbine cycle, with the use solely of hot gas fed in via the first means, while exhaust gases are simultaneously discharged via the second means, can be operated in such a way that the generator generates sufficient energy in order to put the gas turbine plant and an air separation plant possibly present into operation, or respectively in order to serve as emergency generating unit in the event of a failure of the gas turbine plant. In addition, in order to meet the special requirements during start-up or during operation as emergency generating unit, a further switch-over member, via which ambient air can be drawn in, can preferably be arranged upstream of the compressor.

Depending on requirements, the steam turbine arranged in the steam turbine cycle may be designed as a bottoming steam turbine or as a topping steam turbine, the partly expanded exhaust steam of which, after injection into the cycle medium upstream of, in and/or downstream of the combustion chamber, is expanded to ambient pressure in the gas turbine, with power being delivered, in particular a switch-over member being provided with which the exhaust steam can be directed past the gas turbine directly for liquefaction into a cooler arranged in the gas turbine cycle.

Further preferred embodiments of the power station plant according to the invention are described in the dependent patent claims.

The present invention also relates to a method of starting up a power generation plant as described above, which is characterized in that, first of all, in a first phase, the steam turbine cycle is put into operation with hot gas fed in via the first means, while at the same time the exhaust gases are at least partly expelled via the second means, then, in a second phase, the generator is motor-driven with current by a generator arranged in the steam turbine cycle in order to start up the turboset, the compressor, via an air flap arranged upstream and/or via the second means opened in both directions, drawing in fresh air or a combustion-gas mixture and delivering it through the combustion chamber, in which, possibly with additional feeding of largely pure oxygen, fuel is fired, so that the turbine starts to assist the motor-driven generator and finally serves as sole drive, the hot exhaust gases of the gas turbine progressively taking over the steam generation in the heat-recovery boiler and completely taking over the steam generation in the heat-recovery boiler at the end. In this case, the separation into individual phases is not be seen in an absolutely strict sense; corresponding optimum control of the start-up process with partly overlapping sections can be determined by the person skilled in the art.

Furthermore, the present invention relates to a method of starting up a power generation plant as described above, which is characterized in that, first of all, in a first phase, the steam turbine cycle is put into operation with hot gas fed in via the first means, while at the same time the exhaust gases are at least partly expelled via the second means, in that, after the turboset, operated with air as substitute medium via an air flap arranged upstream of the compressor, is running in a self-sustaining manner, in a second phase, the gas turbine cycle is closed via the first and second means and the air flap, and largely pure oxygen is fed as an oxidizing agent to the combustion chamber, gas being continuously expelled from the cycle in order to compensate for the feed of oxygen and fuel, and the composition of the circulating gas progressively approaching an equilibrium, in which the separation and liquefaction of the combustion products can be started. The equilibrium is in this case achieved when the combustion-gas mixture essentially comprises only $CO_2$ and $H_2O$, and nitrogen, oxygen or the like which could disturb the condensation process of the $CO_2$ are no longer present. In this case, the current available after the first phase via the generator can at least partly be used for operating the air separation plant and thus for providing largely pure oxygen for the combustion process in the combustion chamber.

In addition, the power station plant according to the invention may be run in such a way that, when the gas turbine cycle is not operating, only the steam turbine cycle is operated via the feeding-in of hot air with the first means and via the expelling of exhaust gases with the second means, and that the generator arranged in the steam turbine cycle thus provides current in particular in the sense of an emergency generating unit.

Further preferred embodiments of the methods according to the invention are described in the dependent patent claims.

BRIEF DESCRIPTION OF THE FIGURES

The invention is to be explained in more detail below with reference to exemplary embodiments in connection with the figures, in which.

WAYS OF IMPLEMENTING THE INVENTION

Figure 1:
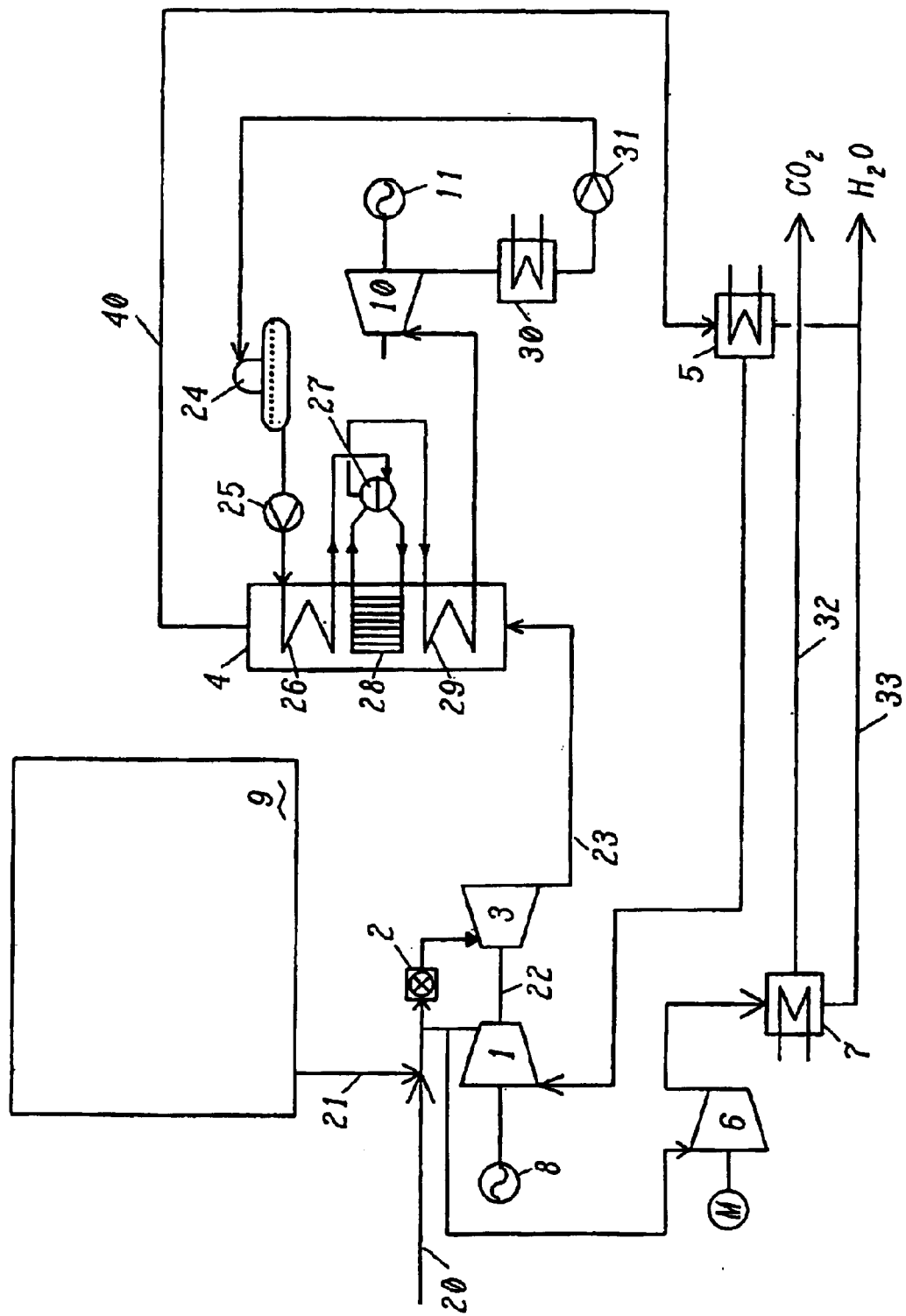
FIG. 1 shows a scheme of an emission-free gas-turbine power station according to the prior art.

FIG. 1 shows the scheme of an emission-free power station with $CO_2/H_2O$ gas turbine and downstream steam cycle with bottoming steam turbine according to the prior art. A $CO_2/H_2O$ turboset, consisting of a compressor 1, a combustion chamber 2, a turbine 3 and a generator 8 arranged on a common shaft 22, is interconnected to form a closed cycle via a heat-recovery boiler 4 and a cooler 5 serving as heat sink. The hot gases issuing from the gas turbine 3 are fed to the heat-recovery boiler via the hot-gas path 23, and the exhaust gases cooled in the heat-recovery boiler 4 are fed downstream of the heat-recovery boiler 4 via the exhaust-gas path 40 to the condenser 5. Up to a limit predetermined by the cooling-water temperature, any desired proportion of the water contained in the working medium can be condensed out by means of the cooler 5. The carbon dioxide produced by the combustion of, for example, natural gas is branched off in steady-state operation by a compressor 6, brought to the pressure required for further use, dried further and liquefied in the cooler 7 and removed from the process via the line 32. In practice, this compression process is advantageously carried out in several stages with interim cooling and drying. Technically pure oxygen, which is obtained in an air separation plant 9 (not described further here and only shown schematically), is delivered via oxygen feed 21 for the oxidation of the fuel in the combustion chamber 2.

The steam obtained in the heat-recovery boiler, within the limits of a conventional cycle arrangement, is admitted to a bottoming steam turbine 10 with generator 11. In this case, the steam cycle comprises the bottoming steam turbine 10, a condenser 30 downstream of it and a pump 31 downstream of said condenser 30, the pump 31 feeding the condensate to a feedwater tank/deacrator 24. The feedwater is fed downstream of the feedwater tank 24 via a pump 25 to an economizer 26 arranged in the heat-recovery boiler 4 and then to the steam drum 27. The steam drum 27 is connected to an evaporator 28, which is likewise arranged in the heat-recovery boiler, and the steam produced in the steam drum 27 is normally superheated in a superheater stage 29 and then fed to the steam turbine 10.

Figure 2:
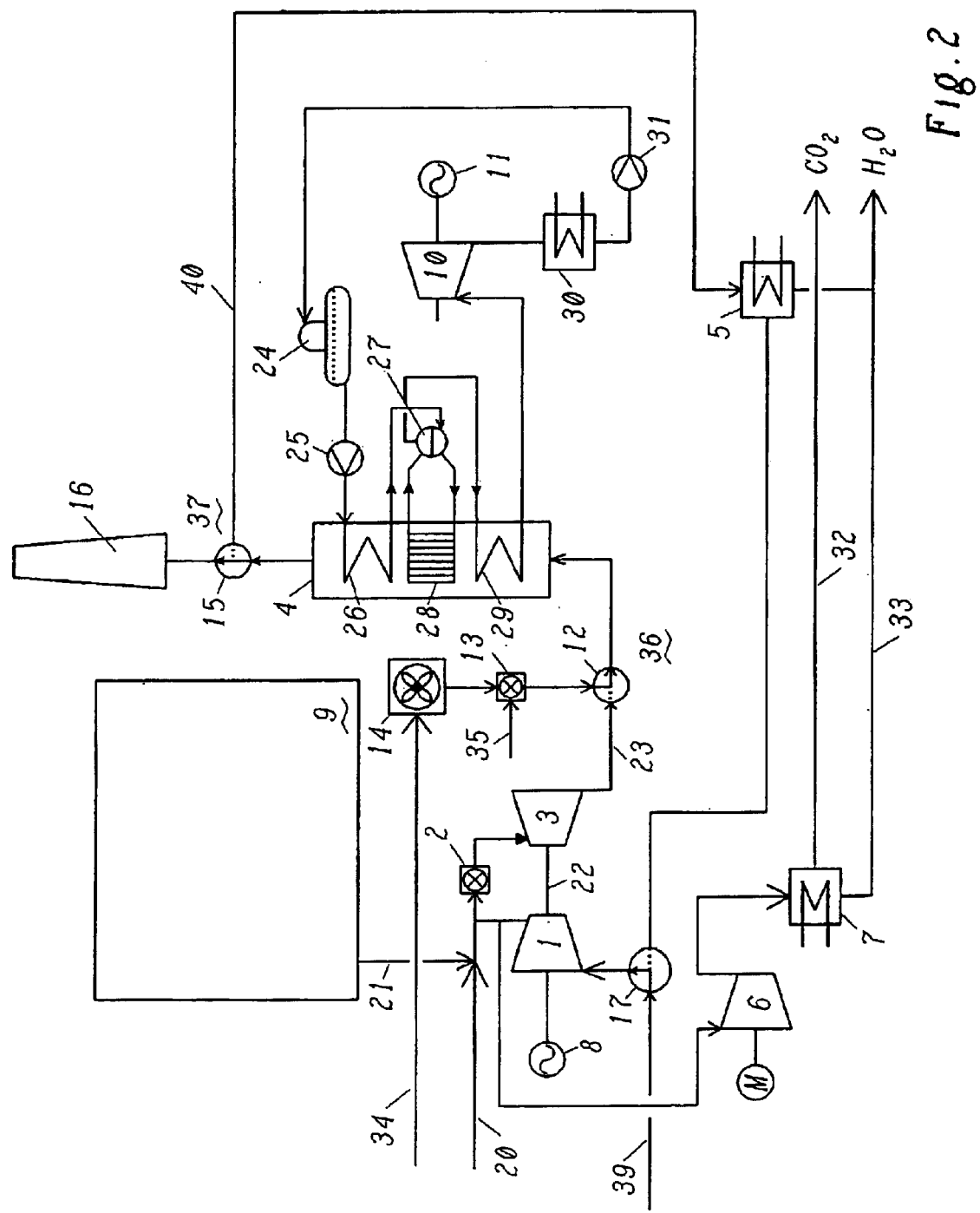
FIG. 2 shows a scheme of an emission-free gas-turbine power station according to the invention with bottoming steam turbine.

In order to be able to now start up this system in a largely autonomous manner, the plant is equipped with the additional components shown in FIG. 2. By means of air flaps or a differently realized switch-over member 12 arranged in the hot-gas path 23, the heat-recovery boiler 4 is switched over on the inlet side from the turbine outlet to one or more auxiliary burners 13 which are supplied with air from one or more blowers 14. On the outlet side, the heat-recovery boiler is connected to an auxiliary stack 16 by a further switch-over member 15 arranged in the exhaust-gas path 40. The flue gases produced in the combustion chamber 13 can escape via this stack. In this way, steam can be generated in the heat-recovery boiler before the gas turbine plant 1–3 is put into operation. The bottoming steam turbine 10 can now generate via its generator 11 the current which is required in order to operate the air separation plant 9 and start up the gas turbine 1–3.

To start up the gas turbine, with switch-over members 12 and 15 opened on both sides (i.e. gas can flow both from 3 and from 13 via 12 in the direction of 4, or from 4 via 15 in the direction of both 16 and 5), the generator 8 is motor-driven and the burner 2 is put into operation with fuel and oxygen from the air separation plant 9. The output of the auxiliary burners 13 and blower(s) 14 is continuously reduced until the exhaust gases of the gas turbine have reached a sufficiently high temperature. The cycle is then closed by means of the switch-over members 12 and 15. Alternatively, the plant can be designed in such a way that ambient air is drawn in via a further switch-over member 17 for starting up the gas turbine.

After completion of the start-up phase, the closed cycle first of all contains a typical combustion-gas mixture with high nitrogen and oxygen content. In order to compensate for the inflow of oxygen and fuel, some of the gas located in the cycle is expelled continuously, for example via the auxiliary stack 16. After a short time, the composition of the circulating gas thus approaches stable equilibrium with carbon dioxide and water as the main components, and the plant can be switched over to completely emission-free operation.

In addition, such a modified power station plant permits separate operation solely of the steam turbine cycle for the purposes of an emergency generating unit. This may become necessary, for example, if the gas turbine plant has to be shut down on account of a failure of the air separation plant 9, or if the gas turbine plant has to be stopped for other reasons.

Figure 3:
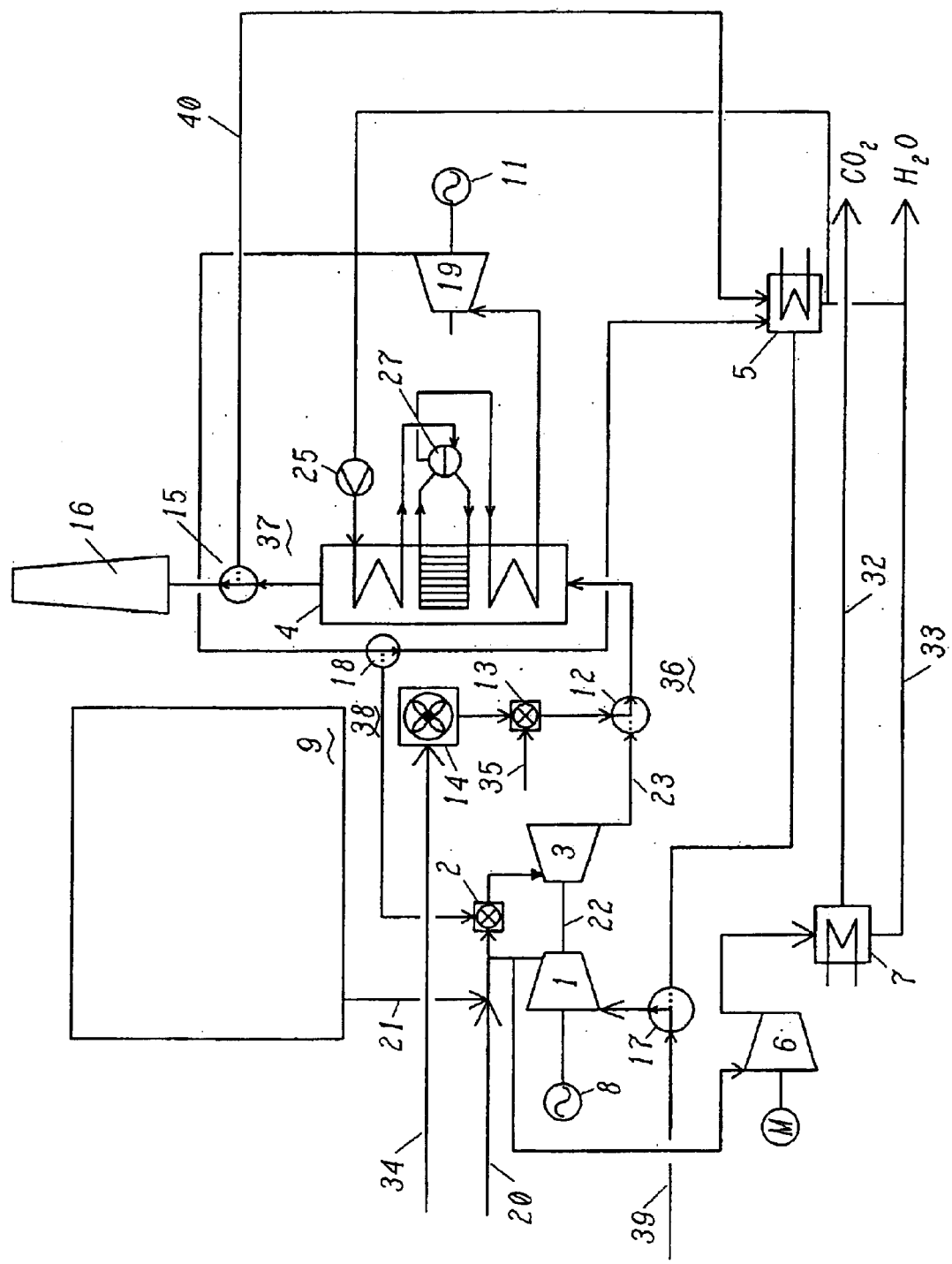
FIG. 3 shows a scheme of an emission-free gas-turbine power station according to the invention with topping steam turbine.

FIG. 3 shows a correspondingly equipped plant embodied with a topping steam turbine. This plant additionally contains a switch-over member 18 with which the steam partly expanded in the topping steam turbine is directed past the gas turbine directly for liquefaction into the cooler 5. Alternatively, the partly expanded steam, before the liquefaction, may also be used for preheating the boiler feedwater (obvious to the person skilled in the art and therefore not shown schematically as an additional option in FIG. 3). If the gas turbine 1–3 is started up, the switch-over member 18 is brought into its normal operating position, and the steam is expanded to ambient pressure in the gas turbine with power being delivered. Since the topping steam turbine, at the same fuel consumption of the auxiliary burners 13, delivers considerably less power than the bottoming steam turbine according to FIG. 2, this construction is suitable for starting up the air separation plant and the gas turbine, but is less suitable for emergency operation.

For the person skilled in the art, it is obvious that the method described above can be applied not only to the two processes described but also to a multiplicity of conceivable process variants which are characterized in that a gas turbine and a steam turbine are combined such that the working medium of the gas turbine is run in an at least partly closed cycle with or without condensing, largely pure oxygen is fed as an oxidizing agent to the cycle, and the steam required is generated in normal operation by utilizing the waste heat of the gas turbine.

LIST OF DESIGNATIONS

1 Compressor
2 Combustion chamber
3 Turbine
4 Heat-recovery boiler
5 Cooler, condenser
6 Compressor
7 Cooler
8 Generator
9 Air separation plant
10 Bottoming steam turbine
11 Generator
12 Switch-over member
13 Auxiliary burner
14 Blower
15 Switch-over member
16 Auxiliary stack
17 Switch-over member
18 Switch-over member
19 Topping steam turbine
20 Fuel feed
21 Oxygen feed
22 Shaft
23 Line to the heat-recovery boiler, hot-gas path
24 Feedwater tank
25 Pump
26 Economizer
27 Steam drum
28 Evaporator
29 Superheater
30 Condenser
31 Pump
32 Discharge line for carbon dioxide
33 Discharge line for water
34 Fresh-air feed
35 Fuel feed 36 Variable hot-gas path
37 Variable exhaust-gas path
38 Variable steam path
39 Fresh-air feed, fresh air
40 Line to the condenser 5, exhaust-gas path

What is claimed is:

1. A power generation plant comprising:
    at least one gas turbine cycle including a heat-recovery boiler and at least one steam turbine cycle in communication with the heat-recovery boiler, the gas turbine cycle being semi-closed and substantially free of emissions, the gas turbine cycle comprising a compressor, a combustion chamber arranged downstream of the compressor, a gas turbine arranged downstream of the combustion chamber, a heat-recovery boiler arranged downstream of the gas turbine, a hot-gas path between the gas turbine and the heat-recovery boiler, an exhaust-gas path downstream of the heat-recovery boiler, and at least one generator coupled to the gas turbine;
    first means for alternatively or additionally allowing hot gas to be fed into said hot-gas path; and
    second means for alternatively or additionally allowing exhaust gas to be expelled from the exhaust-gas path.

2. The power generation plant as claimed in claim 1, wherein the first means and the second means each comprise switch-over members which allow feeding-in or expelling gas.

3. The power generation plant as claimed in claim 2, wherein the switch-over members comprise resetting air flaps.

4. The power generation plant as claimed in claim 1, further comprising:
    at least one auxiliary burner configured and arranged to supply the hot gas to be alternatively or additionally fed into the hot-gas path.

5. The power generation plant as claimed in claim 4, further comprising:
    a blower configured and arranged to supply said at least one auxiliary burner with fresh air.

6. The power generation plant as claimed in claim 1, wherein the gas turbine cycle comprises a $CO_2/H_2O$ gas turbine cycle capable of producing $CO_2$ and $H_2O$, and further comprising:
    means for removing $CO_2$ and $H_2O$ including means for compression or means for cooling, or both; and
    means for supplying the gas turbine cycle with substantially pure oxygen.

7. The power generation plant as claimed in claim 6, wherein the means for removing branches off directly downstream of the compressor.

8. The power generation plant as claimed in claim 7, wherein the means for removing comprises means for removing the $CO_2$ and $H_2O$ in a liquid form, a supercritical form, or both.

9. The power generation plant as claimed in claim 6, wherein the means for supplying substantially pure oxygen comprises an air separation plant.

10. The power generation plant as claimed in claim 9, wherein the air separation plant comprises a cryogenic plant or a diaphragm-based process plant.

11. The power generation plant as claimed in claim 1, wherein said compressor, said combustion chamber, and said gas turbine together comprise a gas turbine plant;
    wherein the steam turbine cycle is substantially closed and includes at least one steam turbine and at least one generator coupled to the at least one steam turbine; and
    wherein the steam turbine cycle, when solely hot gas is fed in via the first means and when gas is simultaneously expelled via the second means, is configured and arranged to be operated so that the at least one generator of the steam turbine cycle generates sufficient energy to:
        put said gas turbine plant and an optional air separation plant into operation, or
        operate as an emergency generating unit in the event of a failure of said gas turbine plant.

12. The power generation plant as claimed in claim 11, further comprising:
    a switch-over member, via which ambient air can be drawn in, arranged upstream of the compressor.

13. The power generation plant as claimed in claim 1, wherein the steam turbine cycle comprises a bottoming steam turbine.

14. The power generation plant as claimed in claim 1, wherein the steam turbine cycle comprises a topping steam turbine that produces partly expanded exhaust steam; and
    wherein the steam turbine cycle is configured and arranged to inject said partly expanded exhaust steam into the gas turbine cycle medium upstream of, in, downstream of, or combinations thereof, the combustion chamber and thereafter expand said partly expanded exhaust steam to ambient pressure in the gas turbine to deliver power.

15. The power generation plant as claimed in claim 14, wherein the gas turbine cycle further comprises a cooler, and wherein the steam turbine cycle comprises a switch-over member configured and arranged to direct the partly expanded exhaust steam past the gas turbine into the cooler directly for liquefaction.

16. A method of starting up a power generation plant as claimed in claim 1, the method comprising:
    in a first phase, putting into operation the steam turbine cycle with hot gas fed in via the first means, while simultaneously the exhaust gases are at least partly expelled via the second means;
    in a second phase, motor-driving the at least one generator of the gas turbine cycle with current from a generator arranged in the steam turbine cycle in order to start up a turboset comprising the compressor, the combustion chamber, and the gas turbine;
    drawing in fresh air or a combustion-gas mixture with the compressor via an air flap arranged upstream or via the second means opened in both directions, or both; and
    delivering the fresh air or a combustion-gas mixture through the combustion chamber in which fuel is fired, so that the turbine starts to assist the at least one motor-driven generator and finally serves as sole drive;
    wherein the hot exhaust gases of the gas turbine progressively take over steam generation in the heat-recovery boiler, until said hot exhaust gas completely takes over steam generation in the heat-recovery boiler.

17. The method as claimed in claim 16, further comprising:
    at least partly using the current available after the first phase from the steam turbine cycle generator for operating an air separation plant, for providing substantially pure oxygen for the combustion process in the combustion chamber.

18. The method as claimed in claim 16, further comprising:
    during or after the first phase, making available a large proportion of the start-up output in the form of heat by auxiliary burners.

19. The method as claimed in claim 16, further comprising:

additionally feeding substantially pure oxygen to the combustor.

20. A method of starting up a power generation plant as claimed in claim 1, the method comprising:

in a first phase, putting into operation the steam turbine cycle with hot gas fed in via the first means, while simultaneously the exhaust gases are at least partly expelled via the second means;

after a turboset comprising the compressor, the combustion chamber, the gas turbine, and the at least one generator, is running in a self-sustaining manner, operated with air as a substitute medium via an air flap arranged upstream of the compressor, in a second phase, closing the gas turbine cycle via the first means and the second means and the air flap;

feeding substantially pure oxygen as an oxidizing agent to the combustion chamber;

expelling gas continuously from the gas turbine cycle in order to compensate for the feed of oxygen and fuel;

wherein the composition of circulating gas progressively approaches an equilibrium; and when said equilibrium is reached, starting the separation and liquefaction of the combustion products.

21. The method as claimed in claim 20, wherein the gas turbine cycle is a $CO_2/H_2O$ gas turbine cycle, and further comprising:

starting the separation and liquefaction of excess carbon dioxide by compressing the carbon dioxide in a compressor to a pressure required for further use; and drying and liquefying the excess carbon dioxide in a cooler.

22. The method as claimed in claim 20, further comprising:

at least partly using the current available after the first phase from the steam turbine cycle generator for operating an air separation plant, for providing substantially pure oxygen for the combustion process in the combustion chamber.

23. The method as claimed in claim 20, further comprising:

during or after the first phase, making available a large proportion of the start-up output in the form of heat by auxiliary burners.

24. A method of operating a power generation plant as claimed in claim 1, the method comprising:

when the gas turbine cycle is not operating, operating only the steam turbine cycle by feeding-in hot air with the first means and by expelling exhaust gases with the second means; and providing current with the steam turbine cycle generator.

25. The method as claimed in claim 24, wherein providing current comprises providing as an emergency generating unit.

* * * * *